(12) United States Patent
Järvinen et al.

(10) Patent No.: US 7,517,383 B2
(45) Date of Patent: Apr. 14, 2009

(54) METHOD FOR RECOVERY OF ZINC BY COUNTERCURRENT LEACHING

(75) Inventors: Aimo Järvinen, Kokkola (FI); Marko Lahtinen, Espoo (FI); Heikki Takala, Pori (FI)

(73) Assignee: Outotec Oyj, Espoo (FI)

( * ) Notice: Subject to any disclaimer, the term of this patent is extended or adjusted under 35 U.S.C. 154(b) by 323 days.

(21) Appl. No.: 10/544,272

(22) PCT Filed: Feb. 24, 2004

(86) PCT No.: PCT/FI2004/000085

§ 371 (c)(1),
(2), (4) Date: May 9, 2006

(87) PCT Pub. No.: WO2004/076698

PCT Pub. Date: Sep. 10, 2004

(65) Prior Publication Data

US 2006/0213332 A1    Sep. 28, 2006

(30) Foreign Application Priority Data

Feb. 26, 2003    (FI)    ................... 20030285

(51) Int. Cl.
*C22B 19/20*    (2006.01)
*C22B 3/08*    (2006.01)

(52) U.S. Cl. ............... 75/725; 75/431; 205/369
(58) Field of Classification Search ............ 75/431, 75/725; 205/369; 423/622, 632–634
See application file for complete search history.

(56) References Cited

U.S. PATENT DOCUMENTS

| 3,959,437 | A |  | 5/1976 | Rastas et al. |
| 4,124,462 | A | * | 11/1978 | Reinhardt et al. ........... 205/605 |
| 4,157,912 | A |  | 6/1979 | Weir et al. |
| 4,252,775 | A | * | 2/1981 | Davister et al. ............... 423/98 |
| 4,676,828 | A |  | 6/1987 | Andre |
| 6,340,450 | B1 | * | 1/2002 | Fugleberg et al. .......... 423/109 |
| 6,475,450 | B1 |  | 11/2002 | Saruta et al. |

FOREIGN PATENT DOCUMENTS

| WO | WO 02/46481 |   | 6/2002 |
| WO | WO 02/46481 A1 | * | 6/2002 |

OTHER PUBLICATIONS

G.G. Graf, Zinc, in Ullmann's Encyclopedia of Industrial Chemistry, Jun. 15, 2000, p. 1-24.*

* cited by examiner

*Primary Examiner*—Roy King
*Assistant Examiner*—Mark L Shevin
(74) *Attorney, Agent, or Firm*—Locke Lord Bissell & Liddell LLP

(57) ABSTRACT

The invention relates to method for leaching zinc-containing materials in connection with the electrolytic recovery of zinc. According to this method, the feed materials i.e. zinc calcine and zinc sulphide, are leached in three stages, in which he sulphuric acid content of the stages rises in accordance with the direction in which the solids are moving. The solids and solution formed in the leaching stages are routed throughout the process countercurrently in relation to each other.

12 Claims, 1 Drawing Sheet

METHOD FOR RECOVERY OF ZINC BY COUNTERCURRENT LEACHING

Figure 1:
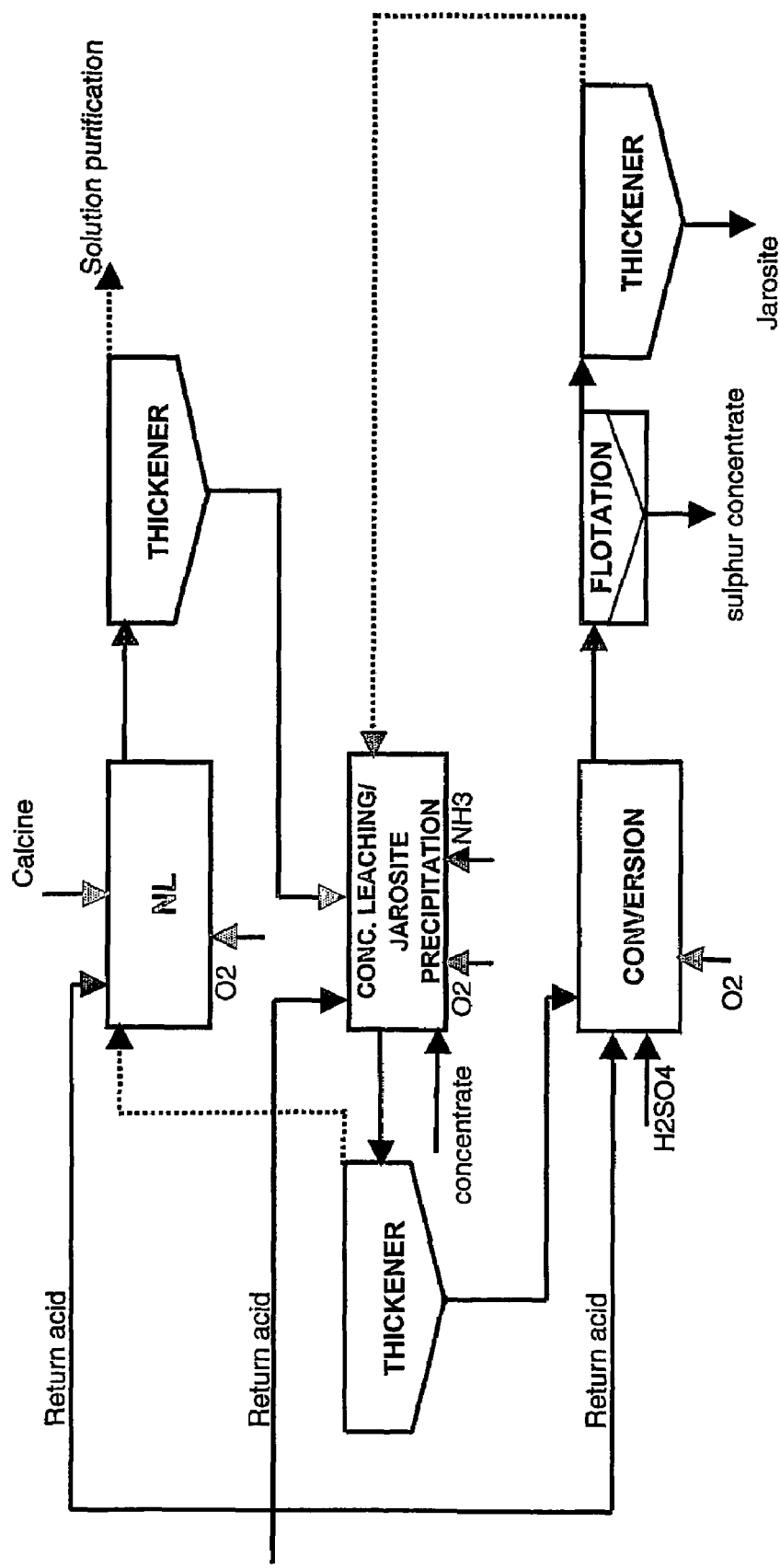

This application is the national phase application under 35 U.S.C. §371 of International Application No. PCT/FI2004/000085 filed on Feb. 24, 2004, entitled, "Method For Recovery Of Zinc By Countercurrent Leaching" which claims the benefit of Finnish Patent Application No. 20030285 filed on Feb. 26, 2003.

The invention relates to a method for leaching zinc-containing materials in connection with the electrolytic recovery of zinc. According to the method, zinc calcine is first leached in a neutral leaching stage, and the resulting solids and zinc concentrate are then leached in a concentrate leaching and jarosite precipitation stage. The concentrate leaching occurs at a low acid concentration while iron is precipitated as jarosite. The concentrate leaching is continued in the conversion stage, which takes place at a high acid concentration, so that the ferrites also dissolve and jarosite precipitation continues. In this method, the solids and solution are fed into the various stages countercurrently with regard to each other, so that the need for neutralization in the different stages is reduced. The zinc sulphate solution formed in the neutral leaching stage is directed to electrolytic precipitation of zinc and iron is separated from the final leaching stage as jarosite.

Zinc calcine, obtained by roasting sulphidic zinc concentrates, is generally used as the starting material in the electrolytic preparation of zinc. The chief component of the calcine is zinc oxide, ZnO, but some of the zinc is also bound to iron in the form of zinc ferrite $ZnO.Fe_2O_3$. The amount of zinc ferrite is usually so considerable that zinc recovery from it is unavoidable. Zinc oxide is easily soluble even at high pH values whereas ferrite has to be leached at a higher acid content. Ferrite leaching is often performed in a separate stage, where both zinc and iron are obtained in solution. The majority of the iron has to be precipitated from this solution before the solution can be returned to the neutral leach and from there to zinc sulphate solution purification and electrolysis. The above process is described in e.g. U.S. Pat. Nos. 3,434,947 and 3,493,365.

In industrial processes zinc oxide leaching, a neutral leach, is generally carried out at a pH of 2-5 and ferrite leaching at an acid content of between 30-100 g $H_2SO_4$/l. The solution from ferrite leaching, which contains the dissolved zinc and iron, is very acidic, and is often pre-neutralised, before the iron is precipitated from it. Ferrite leaching can also be combined with the iron precipitation stage. This method is known as the conversion process and is described in U.S. Pat. No. 3,959,437.

Zinc concentrate leaching is currently also being combined in ever greater amounts with zinc oxide or calcine leaching. The concentrate is fed either to ferrite leaching or is leached as a separate pressure leach. The main component in concentrate leaching is zinc sulphide, ZnS. In addition, the iron in the concentrate is bound to pyrite $FeS_2$, and some of the zinc in the zinc sulphide may be replaced by iron. Therefore zinc processes based on concentrate leaching or those containing a concentrate leaching stage also require an iron removal stage. Three iron precipitation processes are in use, where iron is precipitated as either jarosite, such as $Na[Fe_3(SO_4)_2(OH)_6]$, as goethite FeOOH or as hematite $Fe_2O_3$. When iron is precipitated as jarosite or goethite, a neutralising agent has to be used in precipitation in order to neutralise the sulphuric acid released in the reactions. Normally the neutralising agent is calcine.

In the traditional jarosite process iron is precipitated at a temperature close to the boiling point of the solution. Free acid is neutralised to a value of 3-5 g/l $H_2SO_4$ (optimal pH 1.5). The amount of iron in the zinc sulphate solution is 20-35 g/l. So that the jarosite attains an essentially crystalline form, which has favourable settling properties, potassium, sodium or ammonium ions are also fed into the solution. Goethite precipitation is described for example in U.S. Pat. No. 4,676,828. In this method, the amount of free acid in the zinc sulphate solution entering iron precipitation is 4-8 g/l and the amount of ferric iron 1-2 g/l. Most of the iron is in ferrous form. Oxygen and calcine are fed into the solution so that the iron oxidises and goethite is precipitated as the pH rises.

When iron is precipitated as hematite, it occurs from a solution where the iron is first reduced from trivalent to divalent form. Then the iron is precipitated hydrolitically by oxidation without neutralisation:

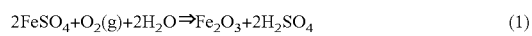
$$2FeSO_4+O_2(g)+2H_2O \Rightarrow Fe_2O_3+2H_2SO_4 \quad (1)$$

The precipitation of iron is however performed in an autoclave at a temperature of about 200° C., the partial pressure of oxygen being about 18 bar, which have essentially restricted the adoption of the method, even though hematite is in fact the most environment-friendly form of iron precipitate.

A zinc recovery process is described in U.S. Pat. No. 6,475,450, where leaching of calcine and concentrate leaching is combined. Zinc calcine is leached normally in the neutral leaching stage, and the resulting solution is routed to electrolysis via solution purification. The neutral leach residue, which consists mostly of zinc ferrite, is routed to the next leaching stage, which is also simultaneously the zinc concentrate leaching stage. The concentrate is leached into the electrolysis return acid and with an aid of trivalent iron of solids from goethite precipitation. The leaching conditions are adjusted so that the ferrites dissolve. Trivalent iron is thus obtained from the dissolved ferrites and, in addition, trivalent iron precipitate from a subsequent iron oxidation stage is also returned to this stage. A solution is obtained from the concentrate leaching stage that contains both zinc and divalent iron in precipitate. The solution obtained from the concentrate leaching stage is oxidised to trivalent in the next stage, the iron oxidation stage, and is precipitated as goethite, but for this purpose the solution must first be neutralised, and the neutralisation is carried out using zinc calcine. Some of the precipitate thus formed is circulated back to concentrate leaching and some is routed to iron precipitation. The solution from the iron oxidation stage is routed to neutral leaching. The next stage shown in the patent flow diagram is strong acid leaching, where iron is dissolved again in reducing conditions ($SO_2$) and at the same time ferrites of the calcine fed into the oxidation stage dissolve. According to the patent, iron is precipitated either as hematite, jarosite or goethite. In the iron precipitation stage the iron has to be reoxidised into ferric form. The zinc sulphate solution from the iron precipitation stage is directed to the neutral leaching stage.

In U.S. Pat. No. 6,475,450 described above, the amount of precipitate to be circulated from the iron oxidation stage is large, because in accordance with reaction (1) it takes one mole of ferric sulphate to dissolve one mole of zinc sulphide. Calcine generally contains between 5-15% of ferrites, so that all the other trivalent iron should be circulated to the stage because no oxygen is fed to the concentrate leaching stage for iron oxidation. After the iron oxidation stage the process has a strong acid leach, where the iron that has been oxidised to trivalent is leached again. When iron is precipitated as hematite, it is done by routing the solution in question to an autoclave and oxidising it there. The patent does also mention, however, that iron may be precipitated as jarosite or goethite.

As stated above, jarosite and goethite precipitation cannot be performed directly after the strong acid leach but the solution has to be neutralised first, so the process requires yet another extra stage. If neutralisation is performed with calcine, at least some of the zinc in the calcine is lost. Neutralisation of process stages with calcine always adds either additional stages to the process, if all the zinc contained in the calcine needs to be recovered or otherwise the total zinc yield is weakened.

U.S. Pat. No. 5,858,315 also describes a method whereby zinc concentrate leaching is combined with zinc calcine leaching. First the calcine is subjected to a neutral leach, from which the resulting zinc sulphate solution is fed via solution purification to the electrolytic precipitation of zinc. The undissolved residue remaining in the neutral leach is routed to ferrite leaching, which occurs in the presence of return acid and oxygen. Concentrate leaching can be performed either with ferrite leaching in the same stage or as a separate sage. In two-stage leaching the solution from ferrite leaching, which now contains the iron from the calcine in mainly divalent form and the zinc sulphate formed in ferrite leaching, is routed to the concentrate leaching stage. Oxygen is also fed into the concentrate leaching stage. In the last leaching reactor the solution is neutralised with calcine. Undissolved precipitate is returned to the ferrite leaching stage and the zinc- and iron-rich solution is conducted to the iron precipitation stage. Pure calcine is also fed to the iron precipitation stage as the neutralising agent and iron is precipitated with oxygen as goethite. The zinc sulphate solution from the iron precipitation stage is routed to the neutral leaching stage.

There are several stages in the method described in U.S. Pat. No. 5,858,315, because it is attempted to recover the zinc from the calcine used as neutralising agent. In addition, iron precipitation is always carried out as a separate stage.

U.S. Pat. No. 6,340,450 describes a method of direct zinc leaching, whereby zinc calcine leaching is first carried out in a neutral leaching stage. The solution obtained from the neutral leach is conducted to zinc electrolysis via solution purification and the sediment formed to the conversion stage, to which zinc sulphide concentrate is also fed. In the conversion stage the ferrites of the calcine dissolve together with the zinc concentrate at the same time as the iron is precipitated as jarosite. According to one embodiment of the patent (FIG. 2) zinc concentrate is routed to the end of the conversion stage, when the ferrite has dissolved and the jarosite has started to precipitate. The sulphuric acid content of the conversion stage is regulated to the region of 10-40 g/l. In the jarosite filtration after the conversion stage the separated zinc sulphate solution is directed back to neutral leaching.

In the method described in U.S. Pat. No. 6,340,450, the conversion and concentrate leaching stage is performed at a relatively high acid concentration. The resulting solution containing zinc sulphate is routed to neutral leaching, and because there is acid in the solution, it must be neutralised in the neutral leach stage. The higher the acid content of the solution, the higher the amount of iron in the solution also in general. As a result, the iron circulation in the process increases.

In all the methods described above, the solid and the solution flow essentially in the same direction, which causes a large demand for neutralisation and/or a multi-stage process.

Now a new method has been developed for the leaching of zinc-containing feed materials in connection with the electrolytic recovery of zinc. According to this method, the feed materials i.e. zinc calcine and zinc sulphide, are leached in three stages, in which the sulphuric acid content of the stages rises in accordance with the direction in which the solids are moving. The solids and solution formed in the leaching stages are directed throughout the process countercurrently in relation to each other.

The first leaching stage is the neutral leaching stage, where the calcine generated in zinc concentrate roasting is leached, and the zinc sulphate solution, which is formed is fed to the electrolytic precipitation of zinc via solution purification. The calcine is leached into sulphuric acid-containing return acid from electrolysis and the solution from the next leaching stage in the process, which solution contains zinc sulphates and iron sulphates. Oxygen and/or air is fed into the leaching stage in order to oxidise the ferrous iron and precipitate it as ferric hydroxide.

All the zinc sulphide concentrate to be fed into the process and undissolved solids from neutral leaching are fed to the following leaching stage, which may be termed a combined concentrate leaching and jarosite precipitation stage, which is performed at a low acid concentration. The solution for the leaching stage is an acidic solution containing zinc sulphate and iron sulphate from the conversion stage, the next stage in the process. Some of the concentrate is leached in the concentrate leaching stage, but at the same time the conditions under which this occurs are such that iron is precipitated as jarosite.

The solids remaining from the second leaching stage are leached in the final stage of the process, the conversion stage, using electrolysis return acid and oxygen at a high acid content, whereby the ferrites of the calcine and the undissolved zinc compounds of the concentrate dissolve and iron precipitates as jarosite. The undissolved precipitate of the final leaching stage contains iron in the form of jarosite and sulphur from the concentrate. The zinc sulphate-containing solution obtained from this stage is directed to the first concentrate leaching stage and further on to the neutral leaching stage. All the leaching stages are carried out in atmospheric conditions and the temperature is kept between 80° C. and the boiling point of the solution.

The essential features of the invention will be made apparent in the attached claims.

The invention is also described by means of the attached flowsheet 1.

As stated above, the first hydrometallurgical stage in the electrolytic recovery of zinc is neutral leaching NL, where calcine is leached by means of zinc sulphate solution recirculated from the following stage in the process and sulphuric acid-containing return acid from electrolysis. The movement of the zinc sulphate-containing solution is shown on the flowsheet with a broken line. The neutral leaching stage is carried out in several reactors and to complete the stage the solution and solids are separated in a thickener. The solids to be fed from one stage to another in this case refer to the underflow of the thickener, which includes both solids fed to the stage but remaining undissolved and also solids precipitated as a result of the reactions. According to the method now developed, the process solids and solution flow countercurrently in relation to each other. Thus zinc sulphate solution is fed into the neutral leaching stage from the subsequent stage of the process, i.e. the concentrate leaching and jarosite precipitation stage, in which the acid content is kept relatively low, at about 2-20 g/l, preferably between 5-15 g/l. Therefore the acid content of the zinc sulphate solution fed into the neutral leaching stage is also relatively low. This is advantageous for the process, since it means that calcine is not required in the neutral leaching stage to neutralise an excess of acid in the solution.

One purpose of the neutral leaching stage is to prepare zinc sulphate solution containing the minimum amount of iron possible, preferably less than 10 mg/l. The zinc sulphate solution entering neutral leaching from later stages of the process always contains some amount of iron, and when the zinc-containing solution comes from a stage where the acid content is relatively low, the amount of iron is also lower. It is beneficial for the process if as much as possible of the iron entering neutral leaching is in divalent form i.e. ferrous sulphate. Iron is preferably oxidised in the neutral leaching stage with oxygen and/or air into iron hydroxide $Fe(OH)_3$ and precipitated out of the solution. When iron is precipitated as ferric hydroxide, minerals harmful in zinc electrolysis such as germanium and antimony can also be co-precipitated out of the solution. When precipitation of these metals occurs during neutral leaching, a separate purification stage is avoided in zinc sulphate solution purification.

The zinc sulphate solution generated in neutral leaching is conducted to the various stages of solution purification and the solids separated from the solution are routed to the next stage, which in this method is the concentrate leaching and jarosite precipitation stage. This stage too is carried out in several reactors. The first part of the stage is the elutriation of the concentrate into the solution that comes from the subsequent process stage i.e. the conversion stage. The solution from the conversion stage is an acidic iron-containing zinc sulphate solution. The acid level of the concentrate is kept relatively low in the leaching stage, at around 5-15 g/l, and therefore the acid of the solution from the conversion stage is neutralised with the sediment from neutral leaching and concentrate. Since neutral leaching is carried out in this method as a single stage, some of the zinc oxide of the calcine remains undissolved and acts as a neutraliser of the acid in the concentrate leaching stage, and at the same time the zinc of the zinc oxide dissolves into zinc sulphate. Return acid is used to regulate the acid level. Oxygen and/or air are also fed into this stage so that the iron remains in ferric form. In order that the iron in the stage is precipitated as jarosite, alkali or ammonium compounds are fed to the stage to precipitate jarosite as a crystal, e.g. ammonium jarosite. The jarosite nuclei required for jarosite precipitation are obtained by means of internal circulation of the stage. The precipitating iron originates from the neutral leaching solids and the solution from the conversion stage.

At the end of the concentrate leaching and jarosite precipitation stage there is again separation of solution and solids. A solution is obtained as the thickener overflow, in which the zinc has dissolved during the stage as zinc sulphate and which also contains a small amount of dissolved iron, and this solution is routed to neutral leaching. The solids obtained as the thickener underflow contains the jarosite that has precipitated during the stage, the ferrite of the calcine and some still undissolved concentrate, and these solids are routed to the conversion stage.

The conversion stage leaching occurs by means of oxygen and electrolysis return acid in an acid concentration in the region of 25-70 g/l, preferably 30-50 g/l. Fresh sulphuric acid is also used to regulate the acid content, which compensates for the sulphate losses of the whole process. This stage also occurs in several reactors. The ferrites contained in the calcine and the concentrate dissolve in the conversion stage conditions, as does the part of the concentrate that did not dissolve in the previous stage. The jarosite formed in the previous stage no longer dissolves, but the dissolved ferrite is precipitated as jarosite. Jarosite forms at this higher acid concentration, too, since there are plenty of jarosite nuclei in the solids, which aids precipitation.

Concentrate leaching occurs both in the actual concentrate leaching stage and the conversion stage according to the following reactions:

$$ZnS + Fe_2(SO_4)_3 \rightarrow ZnSO_4 + 2FeSO_4 + S^\circ \qquad (2)$$

$$2FeSO_4 + 0.5O_2 + H_2SO_4 \rightarrow Fe_2(SO_4)_3 + H_2O \qquad (3)$$

i.e. as a sum reaction:

$$ZnS + 0.5O_2 + H_2SO_4 \rightarrow ZnSO_4 + S^\circ + H_2O \qquad (4)$$

As the reactions show, the oxidation of the concentrate sulphide occurs using trivalent iron, and the divalent iron in the solution is oxidised to trivalent again with the oxygen fed into the stage. In both stages most of the iron is precipitated as jarosite, because only a small amount of the iron in the calcine and the concentrate is required for concentrate leaching. Iron precipitation as jarosite occurs according to the following reaction, where A may be either an alkali or ammonium ion:

$$3Fe_2(SO_4)_3 + A_2SO_4 + 12H_2O \rightarrow 2A[Fe_3(SO_4)_2(OH)_6] + 6H_2SO_4 \qquad (5)$$

The acid formed in the jarosite precipitation reaction is consumed in concentrate leaching.

The slurry formed in the conversion stage may be routed to flotation after said stage. Flotation is not obligatory, if the jarosite and sulphur concentrate can be stored together. In flotation, the slurry is separated by flotating the sulphur and the undissolved sulphides. The majority of sulphides are pyrite. The sulphur concentrate is separated and the end slurry is fed to jarosite separation. The overflow solution from jarosite thickening is a solution containing acid, iron and zinc, which is recirculated to the concentrate leaching and jarosite precipitation stage.

The advantage of the countercurrent leaching of concentrate described above is the simplification of the process. When the concentrate leaching/jarosite precipitation stage takes place after the neutral leaching stage and as the last stage of the conversion stage, the acid content of the stages increases in the direction of flow of the solids. Correspondingly, when the solution is fed countercurrently in relation to the flow of the solids, the acid content of the stages decreases by degrees. This results in a decrease in the need for neutralisation in the different stages. Earlier for instance, the acidic zinc sulphate solution from concentrate leaching was fed into the neutral leaching stage and this acidic solution caused a great demand for neutralisation. In the present method, the solution fed to the neutral leaching stage comes from a stage where the acid content is kept low. When the acid content of the solution fed to neutral leaching is low, its iron content and in particular the divalent and trivalent iron ratio in the solution can also be regulated. As mentioned above, germanium and antimony can also be co-precipitated in connection with the oxidation of divalent iron that occurs in the neutral leaching stage.

The invention claimed is:

1. A method for recovering zinc from a zinc calcine and zinc sulphide concentrate in connection with an electrolytic precipitation of zinc in three stages in atmospheric conditions and at a temperature between 80° C. and the boiling point of the solution, whereby solids and solution move countercurrently in relation to each other and acid content of the leaching stages rises in the direction of the flow of the solids, the method comprising:

a) feeding zinc calcine to a first neutral leaching stage, wherein the leaching in the first stage is carried out with a solution conducted from a second leaching stage, and wherein a zinc sulphate solution obtained from the first leaching stage is directed via solution purification to zinc electrolysis;

b) feeding both zinc concentrate and solids obtained from the first leaching stage to the second concentrate leaching and jarosite precipitation stage, wherein iron contained in raw materials is precipitated as jarosite, and the concentrate leaching is carried out with a solution conducted from a third leaching stage, and wherein the acid content in the second stage is kept at about 2-20 g/L $H_2SO_4$;

c) feeding solids obtained from the second stage to a third leaching stage, wherein the solids obtained from the second stage comprise undissolved ferrites, a portion of the concentrate, and the precipitated jarosite, wherein the ferrites and the portion of the concentrate from the second stage are leached with electrolysis return acid, wherein the acid content in the third stage is kept at about 25-70 g/L $H_2SO_4$, and wherein the undissolved precipitate comprises jarosite.

2. The method according to claim 1, wherein the leaching in the first stage is carried out in a pH range between 2-5.

3. The method according to claim 1, wherein the acid content in the second leaching stage is kept at about 5-15 g/L $H_2SO_4$.

4. The method according to claim 1, wherein the acid content in the third stage is kept at about 30-50 g/L $H_2SO_4$.

5. The method according to claim 1, wherein the leaching in the first stage is carried out using both the solution conducted from the second leaching stage and return acid from electrolysis, wherein the solution conducted from the second leaching comprises zinc sulphates and iron sulphates.

6. The method according to claim 5, wherein the oxygen and/or air is fed into the first leaching stage in order to oxidise the ferrous iron and precipitate it as hydroxide $Fe(OH)_3$, which co-precipitates the harmful minerals in the solution.

7. The method according to claim 6, wherein the harmful minerals are germanium and antimony.

8. The method according to claim 1, wherein the leaching in the second stage is carried out using both oxygen and/or air and the solution conducted from the third leaching stage, wherein the solution conducted from the third leaching stage comprises zinc and iron sulphates.

9. The method according to claim 1, wherein the acid content of the second stage is adjusted using electrolysis return acid.

10. The method according to claim 1, wherein alkali or ammonium ions are fed into the second stage in order to precipitate the jarosite as alkali or ammonium jarosite, and wherein jarosite nuclei are recirculated within the stage.

11. The method according to claim 1, wherein the ferrites and the portion of the concentrate from the second stage are leached in the third stage using both oxygen and the electrolysis return acid.

12. The method according to claim 1, wherein flotation is performed on the solids formed during the third stage in order to form sulphur concentrate.

* * * * *